(12) United States Patent
Witt et al.

(10) Patent No.: US 9,290,335 B1
(45) Date of Patent: Mar. 22, 2016

(54) BIN SWEEP WITH MULTIPLE BRANCHES

(71) Applicants: William A. Witt, Harrisburg, SD (US); Leroy B. Stumpe, Hartford, SD (US)

(72) Inventors: William A. Witt, Harrisburg, SD (US); Leroy B. Stumpe, Hartford, SD (US)

(73) Assignee: Sioux Steel Company, Sioux Falls, SD (US)

( * ) Notice: Subject to any disclaimer, the term of this patent is extended or adjusted under 35 U.S.C. 154(b) by 87 days.

(21) Appl. No.: 14/107,359

(22) Filed: Dec. 16, 2013

Related U.S. Application Data

(60) Provisional application No. 61/737,403, filed on Dec. 14, 2012.

(51) Int. Cl.
*B65G 65/48* (2006.01)
*B65G 65/42* (2006.01)

(52) U.S. Cl.
CPC .......... *B65G 65/4836* (2013.01); *B65G 65/425* (2013.01)

(58) Field of Classification Search
CPC ........ B65G 65/20; B65G 65/30; B65G 65/38; B65G 65/42; B65G 65/425; B65G 65/44; B65G 65/4836; B65G 2814/0276; A01F 25/2018; A01F 25/2009; B65D 88/68
See application file for complete search history.

(56) References Cited

U.S. PATENT DOCUMENTS

| | | | |
|---|---|---|---|
| 822,547 A * | 6/1906 | Nicolson | 414/313 |
| 2,646,023 A | 7/1953 | Virgil | |
| 2,801,137 A | 7/1957 | Clay | |
| 3,065,996 A | 11/1962 | Patz | |
| 3,067,914 A | 12/1962 | Ellaby | |
| 3,181,715 A | 5/1965 | Olson | |
| 3,204,786 A * | 9/1965 | Kucera | 414/295 |
| 3,228,514 A * | 1/1966 | Kucera | 198/510.1 |
| 3,229,665 A | 1/1966 | Baltz | |
| 3,231,106 A * | 1/1966 | Bruecker | 414/318 |
| 3,291,325 A | 12/1966 | Henningson | |
| 3,338,636 A | 8/1967 | Chapman | |
| 3,438,517 A | 4/1969 | Steffen | |
| 3,455,470 A | 7/1969 | Kanagy | |
| 3,472,357 A | 10/1969 | Strocker | |
| 3,647,094 A | 3/1972 | Jackson | |
| 3,828,916 A | 8/1974 | Patz | |
| 3,908,840 A | 9/1975 | Lambert | |

(Continued)

FOREIGN PATENT DOCUMENTS

| | | |
|---|---|---|
| FR | 1032110 | 6/1953 |
| FR | 2309442 | 11/1976 |
| FR | 2348132 | 11/1977 |

OTHER PUBLICATIONS

G & G Manufacturing SC-X 4 Ratchet Slip Clutches, Jun. 17, 2012, https://web.archive.org/web/20120617003451/http://www.ggmfg.com/Products/CouplersClutches/SCX4RatchetSlipClutches.aspx.

*Primary Examiner* — Glenn Myers
(74) *Attorney, Agent, or Firm* — Jeffrey A. Proehl; Woods, Fuller, Shultz & Smith, P.C.

(57) ABSTRACT

A sweep system for moving particulate matter in a bin having a bin floor may comprise a sweep apparatus having at least two branches. Each of the branches may include a sweep assembly having an inboard end for locating toward a central area of the bin and an outboard end for locating toward a peripheral area of the bin, and each of the sweep assemblies may include a particulate sweep structure configured to move the particulate matter toward the inboard end. The sweep assemblies of the branches may be connected together at the inboard ends thereof.

16 Claims, 8 Drawing Sheets

(56) References Cited

U.S. PATENT DOCUMENTS

| | | | | |
|---|---|---|---|---|
| 3,946,861 | A | 3/1976 | Sandefur | |
| 3,974,908 | A | 8/1976 | Keichinger | |
| 4,022,335 | A | 5/1977 | Lambert | |
| 4,242,028 | A | 12/1980 | Van Dusen | |
| 4,313,705 | A | 2/1982 | Jackson | |
| 4,329,105 | A | 5/1982 | Buschbom | |
| 4,516,898 | A | 5/1985 | Cantenot | |
| 4,619,577 | A | 10/1986 | Swanson | |
| 4,655,666 | A | 4/1987 | Cantenot | |
| 4,669,941 | A | 6/1987 | West | |
| 4,762,220 | A | 8/1988 | Lutke | |
| 4,773,808 | A * | 9/1988 | Fischer et al. | 414/317 |
| 4,775,278 | A * | 10/1988 | Fischer et al. | 414/317 |
| 4,875,820 | A | 10/1989 | Lepp | |
| 4,998,855 | A | 3/1991 | Tschernatsch | |
| 5,088,871 | A | 2/1992 | Mellish | |
| 5,099,983 | A | 3/1992 | Valdez | |
| 5,186,596 | A | 2/1993 | Boucher | |
| 5,639,200 | A | 6/1997 | Jiskoot | |
| 5,769,590 | A | 6/1998 | Weikel | |
| 6,039,647 | A * | 3/2000 | Weikel | 460/114 |
| 6,254,329 | B1 | 7/2001 | Sukup | |
| 6,280,331 | B1 | 8/2001 | Tuttlebee | |
| 6,499,930 | B1 | 12/2002 | Dixon | |
| 6,948,902 | B2 | 9/2005 | Hanig | |
| 7,588,405 | B2 | 9/2009 | Johnson | |
| 8,770,388 | B1 | 7/2014 | Chaon | |
| 2004/0146381 | A1 | 7/2004 | Hanson | |
| 2005/0263372 | A1 | 12/2005 | Hollander | |
| 2006/0245864 | A1 * | 11/2006 | Epp et al. | 414/310 |
| 2010/0239399 | A1 | 9/2010 | Hoogestraat | |
| 2013/0064629 | A1 | 3/2013 | Schuelke | |

* cited by examiner

BIN SWEEP WITH MULTIPLE BRANCHES

BACKGROUND

1. Field

The present disclosure relates to bin sweeps and more particularly pertains to a new bin sweep with multiple branches for increasing the rate at which particulate matter such as grain may be removed from the bin.

2. Description of the Prior Art

Known bin sweeps are employed to move particulate matter, and in many applications grain particles, toward the center of the bin floor so that the grain is able to fall through an opening in the floor into a space, or sump, which is in communication with a conveyor that moves the grain below the floor from the sump to a location outside of the perimeter wall of the bin. The bin sweep is generally elongated with an inboard end that is positioned toward the center of the bin floor, and an outboard end that is positioned radially outward from the inboard end toward the perimeter wall of the bin. The perimeter of the bin is generally circular and the bin sweep rotates or pivots about the inboard end so that the outboard end moves along the circumference of the bin floor. Typically, the bin sweep clears the bin by making a single complete pass about the bin interior and the sump to clear the bin of grain.

SUMMARY

In one aspect, the present disclosure relates to a sweep system for moving particulate matter in a bin having a bin floor, and the sweep system may comprise a sweep apparatus having at least two branches. Each of the branches may include a sweep assembly with an inboard end for locating toward a central area of the bin and an outboard end for locating toward a peripheral area of the bin. Each of the sweep assemblies may include a particulate sweep structure moves the particulate matter toward the inboard end. The sweep assemblies of the branches may be connected together at the inboard ends thereof.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 8 thereof, a new bin sweep with inclined portion that embodies the principles and concepts of the disclosed subject matter will be described.

In the broadest aspects, the disclosure relates to a bin sweep system 10 for moving particulate matter in a bin. In many applications, the particulate matter is grain, although the system is suitable for use with the storage of other types of materials that have a particulate character and that is relatively dry. The bin has a bin floor 2 on which the particulate matter rests and is piled. The bin may also have an outer perimeter that is circular, and a substantially cylindrical perimeter wall that extends upwardly from the floor to define the interior of the bin. A roof on the bin may complete the boundaries of the bin interior.

The bin sweep system 10 may further comprise a bin sump that extends into the bin floor from an opening in the plane of the floor surface, and the sump opening may be covered by a grate or other structure that allows grain to pass through while preventing larger objects or agglomerations of grain particles to pass into the sump. Typically, the bin sump is located toward the center of the bin floor, but in some installations the sump may be positioned to a side of the actual center point of the bin floor in an offset or off-center location.

Another aspect of the disclosure relates to a sweep apparatus 12 that may form a part of the sweep system 10 and may be located in the interior of the bin. Generally, the sweep apparatus 12 may rest upon the surface of the bin floor and move across the bin floor to engage and move grain particles that are piled on the floor. The sweep apparatus may have a center pivot 13 about which the apparatus 12 rotates, and the center pivot 13 is typically positioned at a central area of the bin floor.

Figure 1:
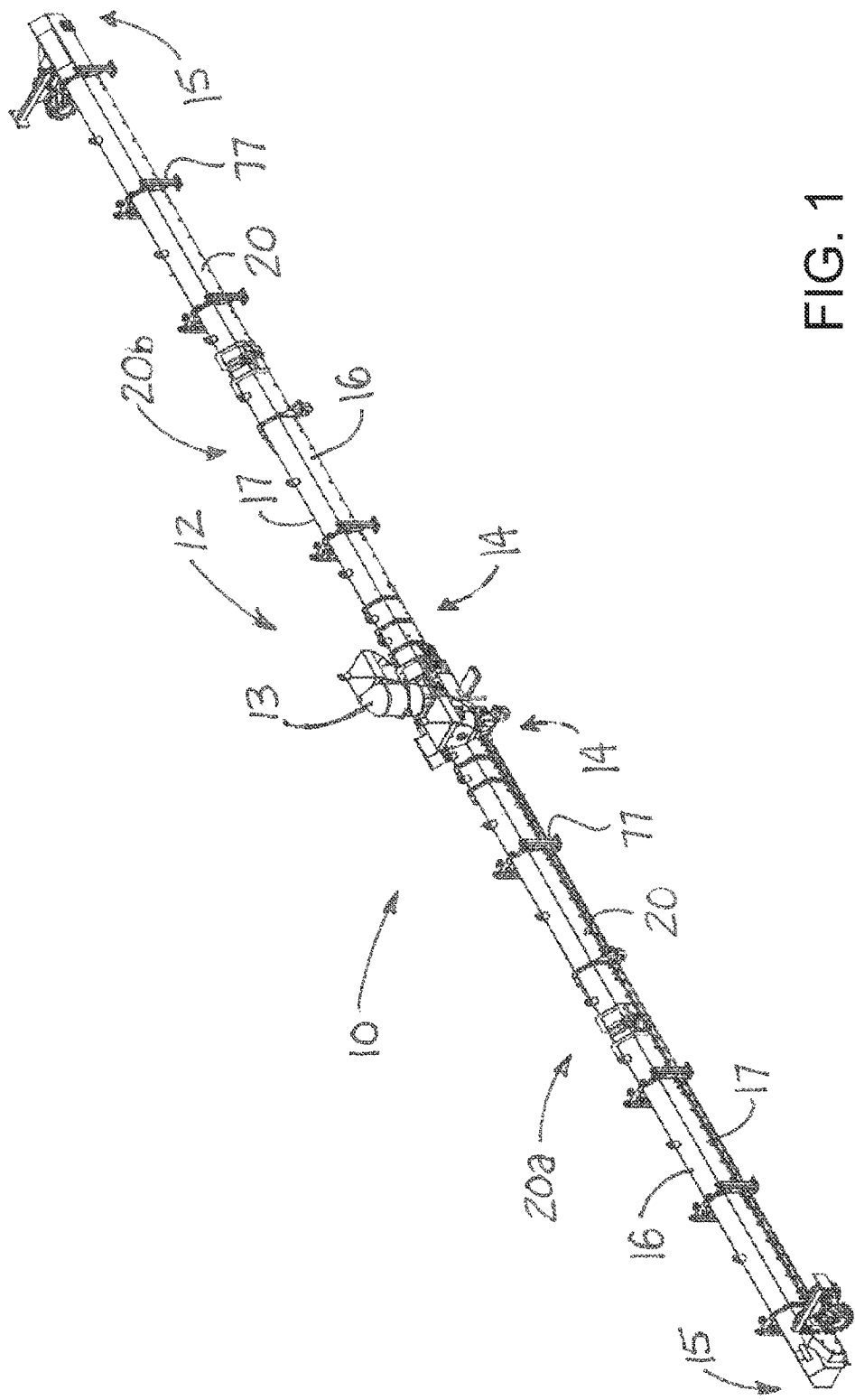
FIG. 1 is a schematic perspective view of an embodiment of a new bin sweep with multiple branches according to the present disclosure with two branches.
Figure 2:
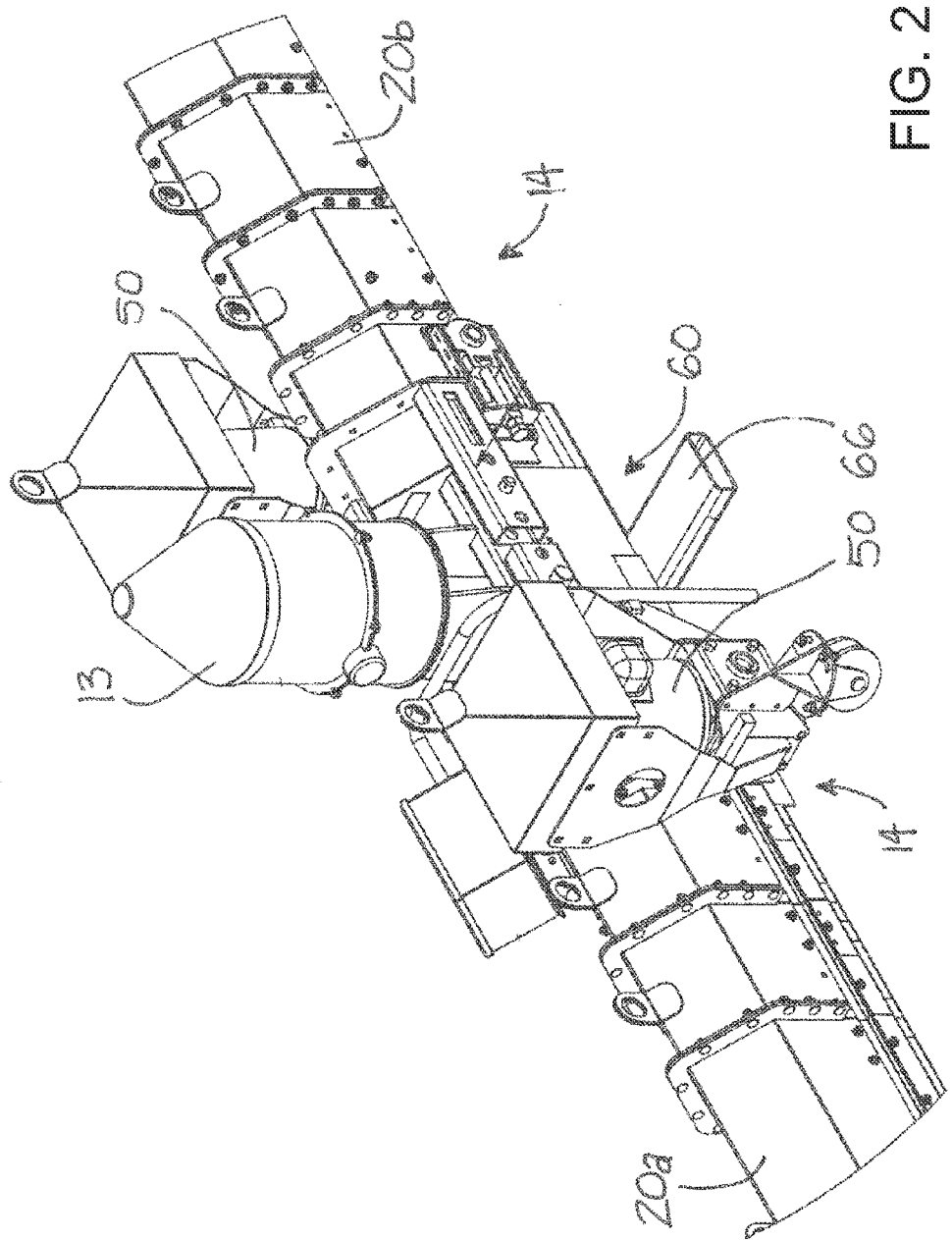
FIG. 2 is a schematic perspective view of a middle of the bin sweep and the inboard end portions of the two branches.
Figure 3:
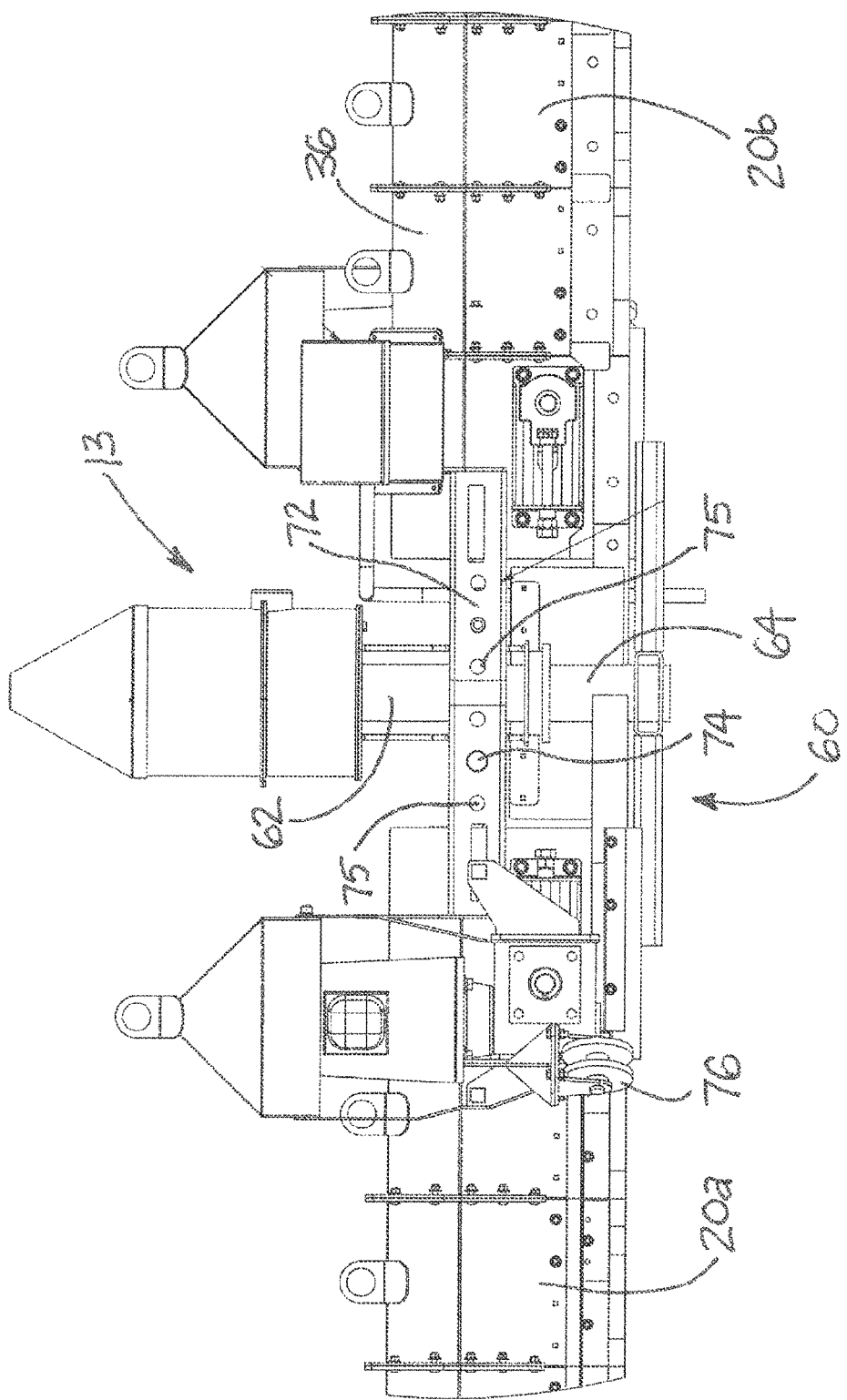
FIG. 3 is a schematic side view of the middle of the bin sweep and the inboard end portions of the two branches.
Figure 4:
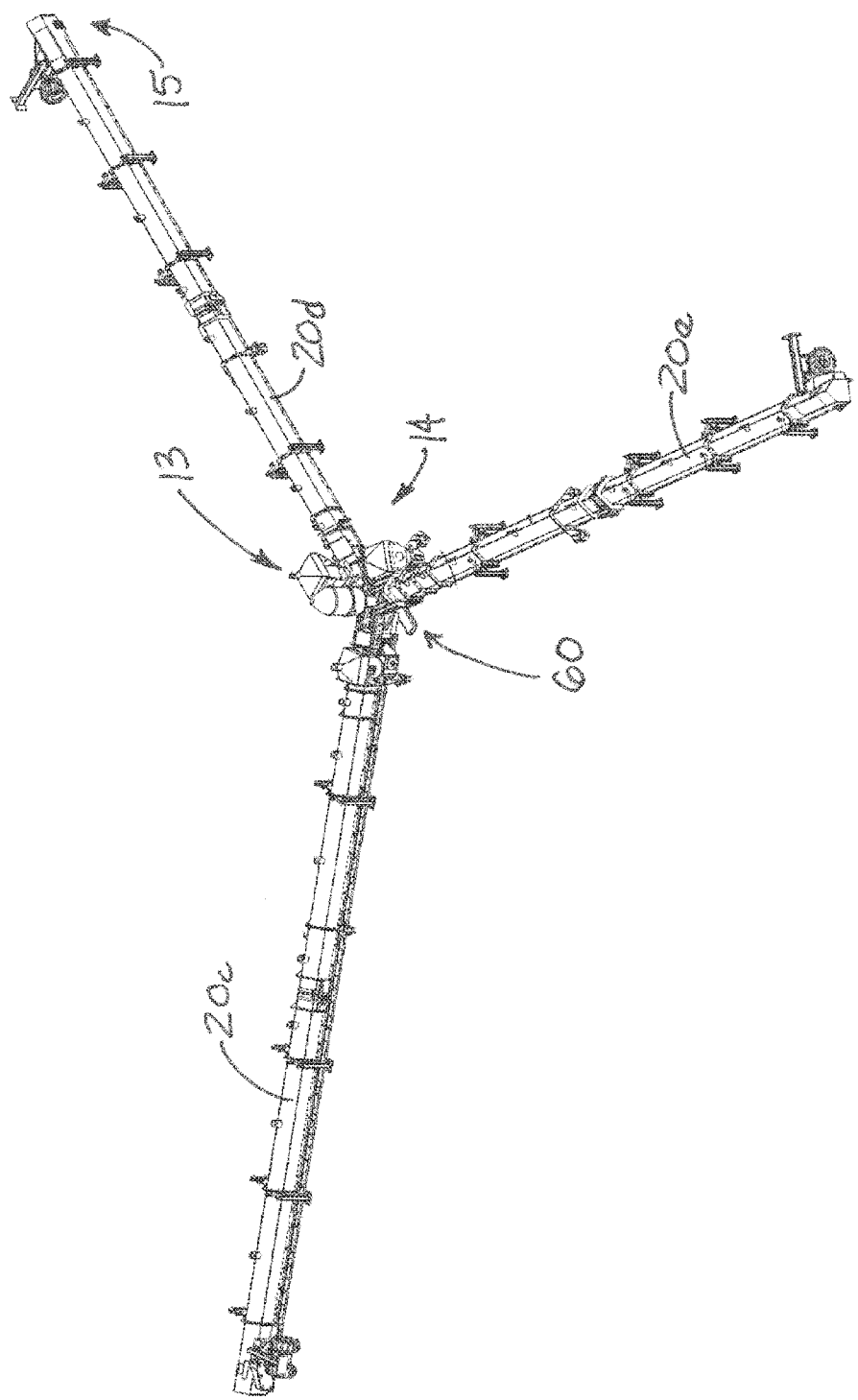
FIG. 4 is a schematic perspective view of an embodiment of a new bin sweep according to the present disclosure with three branches.
Figure 5:
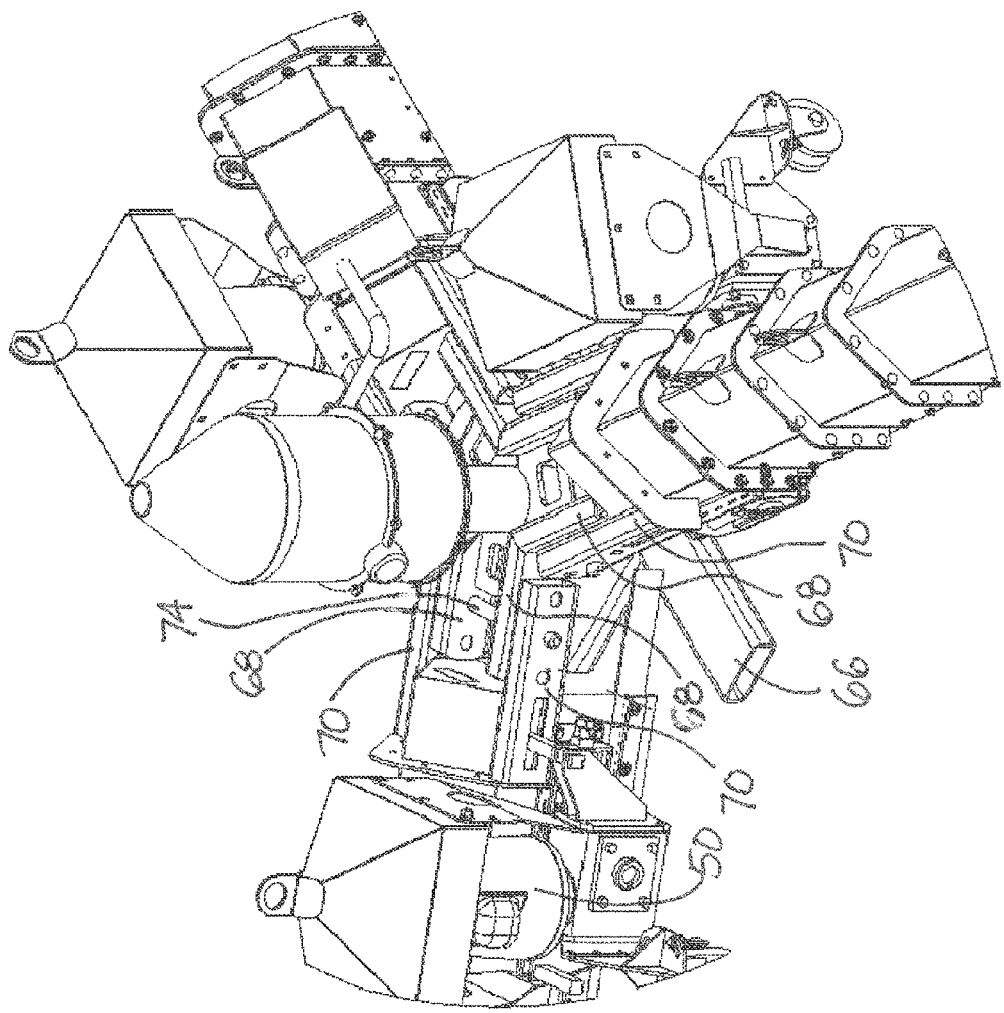
FIG. 5 is a schematic perspective view of a middle of the bin sweep and the inboard end portions of the three branches.
Figure 6:
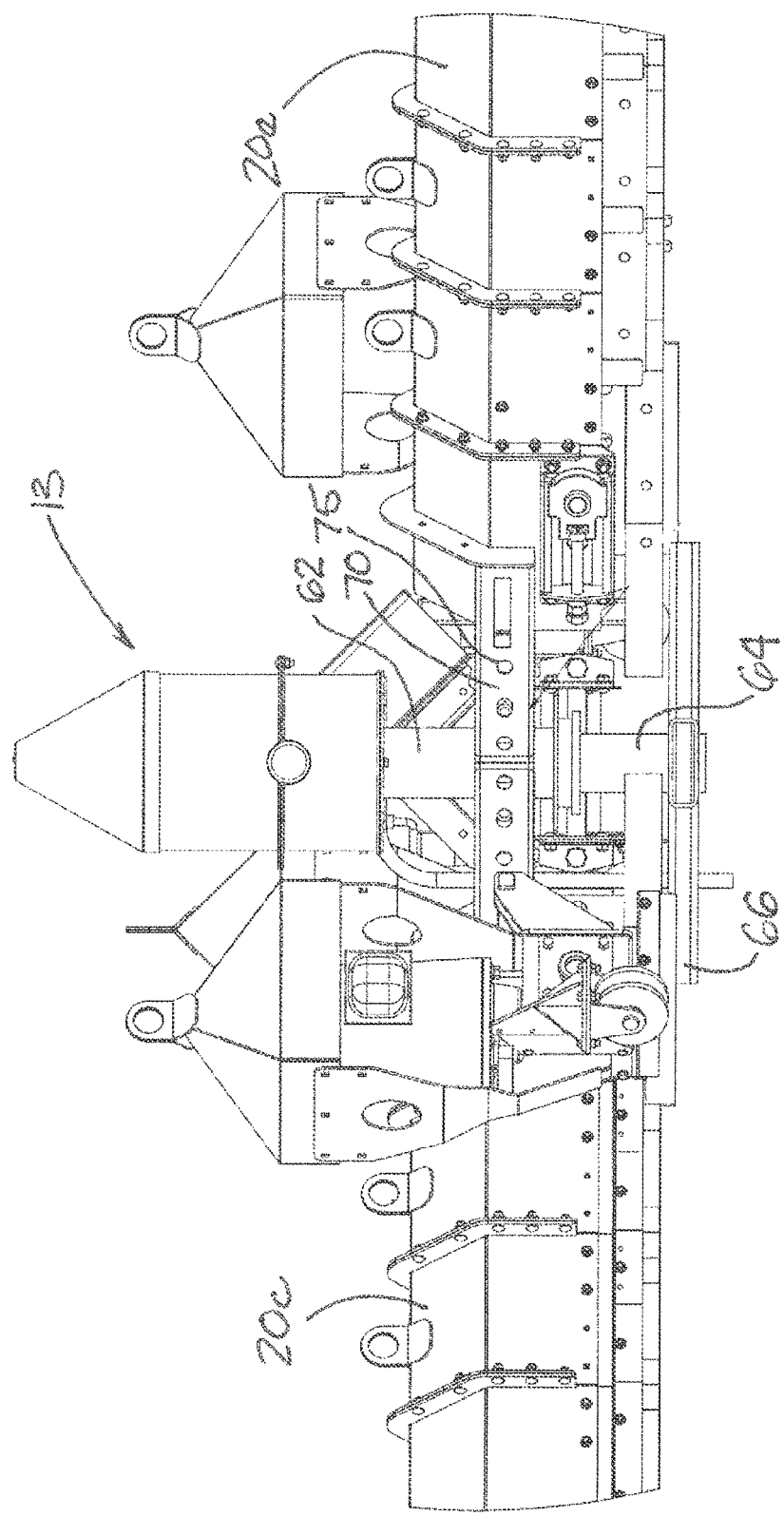
FIG. 6 is a schematic perspective view of the middle of the bin sweep and the inboard end portions of the three branches.
Figure 7:
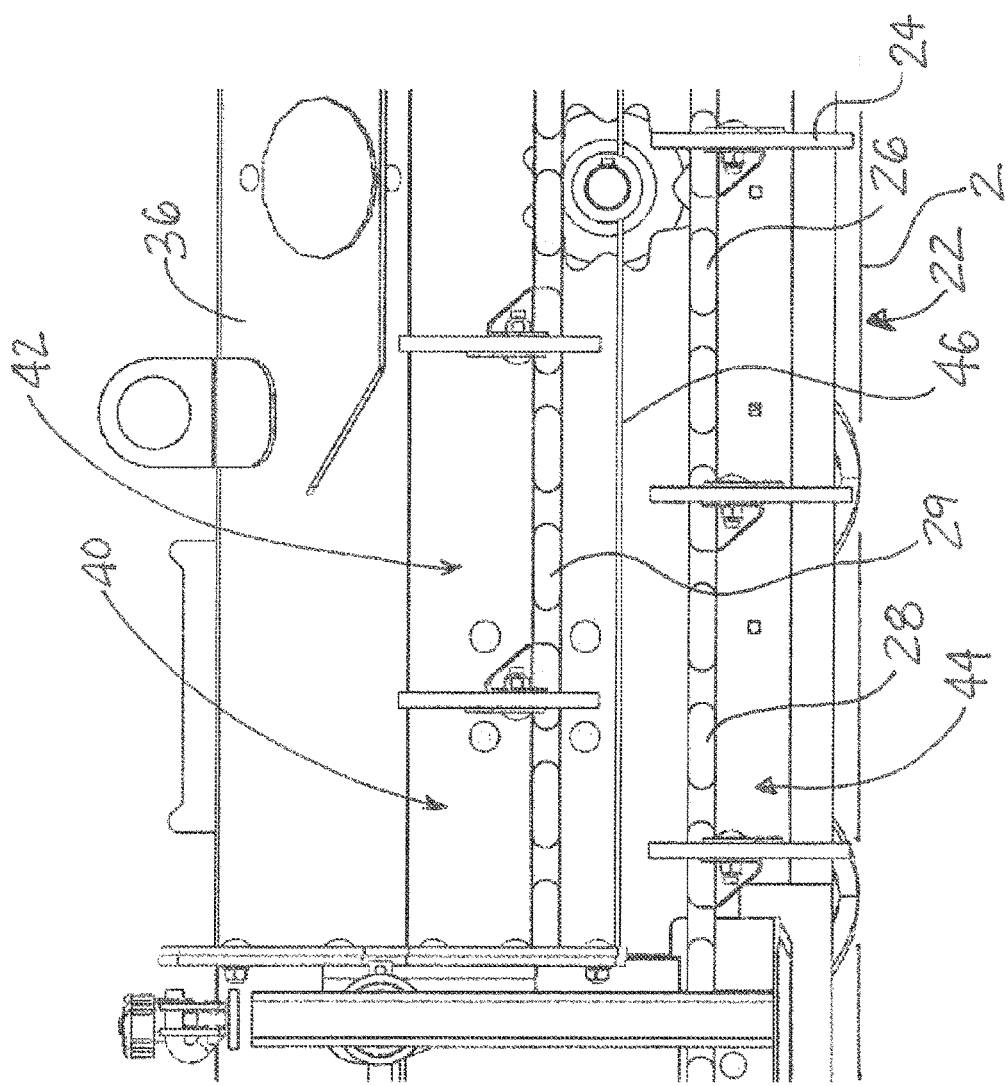
FIG. 7 is a schematic side sectional view of a section of the sweep assembly of one of the branches of the bin sweep apparatus showing aspects of the particulate sweep structure.
Figure 8:
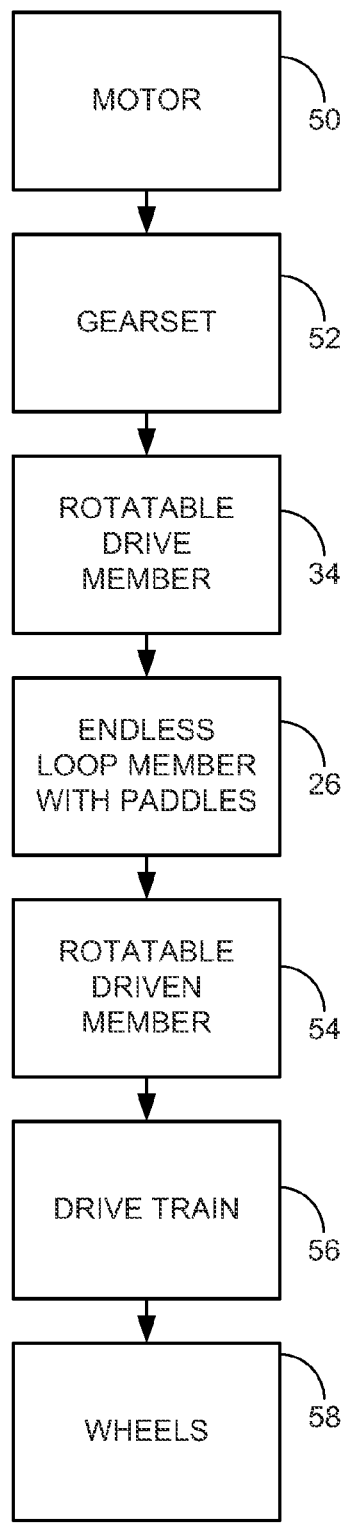
FIG. 8 is a schematic diagram of elements of the sweep assembly of one of the branches for transmitting power from a motor of the sweep assembly to the drove wheels of the sweep assembly.

Significantly, the sweep apparatus 12 may have two or more branches that radiate outwardly from the center pivot 13 of the sweep apparatus. FIGS. 1 through 3 show an illustrative embodiment with two branches (20a, 20b), and FIGS. 4 through 6 show an illustrative embodiment with three branches (20c, 20d, 20e). Additional branches may optionally be employed. In the embodiments of two branches, the branches 20a, 20b may extend in substantially opposite directions from each other such that the branches 20a, 20b are substantially linear and extend along a common axis. In the embodiments of three branches, the branches 20c, 20d, 20e may be oriented with substantially equal angles between the branches and thus may have axes that are oriented at approximately 120 degrees with respect to each other. Embodiments with more than three branches may also be oriented with substantially equal angular gaps therebetween. The angular relationship between the branches may be substantially fixed such that it may not be varied as the apparatus 12 rotates.

In some embodiments, each of the branches comprises a sweep assembly 20, and each of the sweep assemblies may be operable independent of the sweep assemblies of the other branches, although this is not critical. Each of the sweep assemblies of the branches has opposite ends 14, 15, with one end being an inboard end 14 for locating toward a central area of the bin and toward the center 13 of the sweep apparatus. The other end of the sweep assembly is an outboard end 15 for locating toward a peripheral or perimeter area of the bin floor. Each sweep assembly has a forward side 16 that is intended to be oriented toward a direction of movement of the sweep apparatus and a rearward side 17 that is oriented away from the direction of movement.

The sweep assemblies 20 of the sweep apparatus 12 are movable over the floor 2 of the bin. The sweep assemblies of the branches 20a-20b and 20c-20e may be substantially identical in configuration, and the sweep assembly of one branch will be described as being illustrative of all of the assemblies of the branches of the apparatus 10, although this identity is not necessary or critical to the disclosure. In some embodiments, the sweep assembly 20 may include at least two units, with the units being arranged in a substantially linear array between the inboard 14 and outboard 15 ends of the sweep apparatus. Combining and connecting different numbers of units and units of different lengths may provide a variety of lengths between the inboard and outboard ends to accommodate bins having different floor diameters. Generally the units of the assembly may be modular to permit assembly of the units into the linear array. Some units may differ from others for special purposes and functionality, such as a power unit providing power to the assembly 20 and a drive unit providing motion to the assembly 20. With an accurate length achieved, the inboard end 14 may be positioned adjacent to the sump and the outboard end may be positioned at the outer perimeter of the bin floor such that substantially all regions of the bin floor surface may be reached by the sweep assembly.

The sweep assembly 20 may comprise a particulate sweep structure 22 that is configured to move particulate matter on the bin floor beneath the sweep apparatus toward an end of the elongated sweep assembly. The particulate sweep structure 22 may tend to move the particulate matter (such as grain) toward the inboard end 14 which may be located in the vicinity of the sump. The particulate sweep structure may comprise a plurality of interconnected paddles 24 movable in a succession on a path along at least a portion of the sweep assembly 20 between the inboard 14 and outboard 15 ends. The plurality of paddles 24 may be mounted on an endless loop member 26 at spaced locations along the endless loop, and may extend outwardly from the loop to depend downwardly to the floor along a portion of the path of the interconnected paddles. The endless loop member 26 may have an incoming stretch 28 generally moving along a portion of the path from the outboard end 15 toward the inboard end 14 and an outgoing stretch 29 generally moving along a portion of the path from the inboard end toward the outboard end. Generally, the incoming stretch 28 is located below the outgoing stretch, although this is not critical to the operation of the sweep structure as long as the incoming stretch is able to effectively contact and move the grain particles. It will be recognized that as the endless member (and the paddles connected thereto) move along the path, a point on the endless loop member will be constantly moving between positions on the incoming stretch and positions on outgoing stretch. The endless loop member may comprise a series of interconnected links, for example, a plurality of connected chain links, although other structures may be employed for the loop member.

The particulate sweep structure 22 of the sweep assembly 20 may further comprise a rotatable drive member 34 on which a portion of the endless loop member 26 may be engaged or entrained such that rotation of the drive member causes the loop member and the paddles to move along the path. The rotatable drive member 34 may be positioned toward the inboard end 14 of the sweep apparatus. In some embodiments, and in particular those embodiments in which the endless loop member 26 is a chain, the rotatable drive member 34 may comprise a sprocket with alternating teeth and troughs.

The sweep assembly 20 may also include a housing 36 generally extending between the opposite ends of the sweep apparatus, and the housing may comprise a plurality of segments 38 with each of the segments corresponding to one of the units of the sweep assembly. The housing may define an interior 40, and at least a portion of the particulate sweep structure 22 may be positioned in the interior of the housing. The interior 40 may have an upper space 42 and a lower space 44, with a housing floor 46 dividing the interior 54 into the upper space and the lower space. The lower space generally extends between the housing floor and the bin floor 2, and the incoming stretch 28 of the endless loop member (and the paddles connected thereto) may be generally located in the lower space. The outgoing stretch 29 of the endless loop member (and the paddles connected thereto) may be generally located in the upper space 42 of the housing.

In some embodiments of the sweep apparatus, the particulate sweep structure of the sweep assembly of each of the branches is separately powered by a motor 50 that may be located toward the inboard end 14 of the respective sweep assembly, although this is not critical. The motor 50 may rotate the rotatable drive member 34 through a gearset 52, which in turn moves the endless loop member 26 and the paddles 24 mounted thereon. In some highly preferred embodiments, the motor 50 also powers a drive assembly that engages the bin floor and moves the sweep assembly across the bin floor. The drive assembly may be driven by the endless loop member 26 through a rotatable driven member 54 which is engaged by the loop member. In embodiments in which the loop member is a chain, the driven member 54 may comprise a chain sprocket. The driven member 54 may be connected to a drive train 56 that connects the driven member 54 to one or more wheels 58 that engage the surface of the bin floor. By this structure, the particulate sweep structure 22 and the drive assembly are powered by the same motor 50 and the need for separate motors for these assemblies is avoided. Also, all rotational motion of the branches of the sweep apparatus may be generated by the sweep assemblies such that no mechanism is provided at the center pivot 13 to rotate the sweep apparatus.

The sweep apparatus 12 may also comprise a connection structure 60 that connects the sweep assembly of each of the branches to the center pivot 13 in a manner that provides a degree of freedom of movement by each of the branches without permitting the branches to significantly interfere with the operation of the other branches. The connection structure 60 may include a pivot sleeve 62 that is mounted on a central shaft 64 the tower of the center pivot 13 such that the sleeve is able to rotate with respect able to the central shaft. The central shaft may be supported in an upstanding position by legs 66 radiating from the central shaft, although other means for supporting the central shaft may be employed.

The connection structure 60 may include an inner connector portion 68 for each of the branches employed on the sweep apparatus 12. The inner connector portion 68 may be united to the pivot sleeve 62 to rotate with the pivot sleeve, and may radiate outwardly from the sleeve 62 toward the inboard end of the respective sweep assembly. Thus, in embodiments having a pair of branches 20a, 20b, the inner connector portions may extend in substantially opposite directions and in embodiments with three branches 20c, 20d, and 20e, the inner connector portions extend in directions oriented at approximately 120 degree angles. The positions of the inner connector portions 68 may be substantially fixed with respect to the positions of the other inner connector portions.

An outer connector portion 70 of the connection structure 60 may be mounted on the inboard end of the respective sweep assembly and may extend inwardly toward the center pivot 13 in a position adjacent to the inner connector portion 68. Illustratively, the outer connector portion 70 is positioned on opposite sides of the inner connector portion 68 although this is not critical. In the illustrative embodiments, each of the connector portions 68, 70 comprise a pair of spaced arms relation. The arms of the inner connector portion may be positioned between the arms of the outer connector portion, and the arms of the respective connector portions may be connected together by a pivot pin 74 that passes through the arms of the inner and outer connector portions and is generally horizontally oriented to permit pivoting of the connector portions in a generally vertical plane with respect to each other. By this structure, the sweep assembly is able to move upwardly and downwardly with respect to the center pivot as the sweep assembly rotates and the elevation of the surface of the bin floor varies. To provide additional adjustment options, the arms of the inner connector portion and/or the arms of the outer connector portion may be provided with multiple holes 75 through which the pivot pin 74 may be passed to allow for positioning of the inboard end of the sweep assembly relatively closer inward and further outward from the center pivot 13.

As each of the sweep assemblies may be individually powered by a separate motor, as well as the fact that each of the sweep assemblies may encounter different amounts of grain to be moved, the connection structure 60 may be subjected to significant stress as each sweep assembly attempts to move over the floor at a somewhat different pace. Use of tubular elements for the arms of the inner and outer connector portions provides additional strength to the resulting connection of the sweep assembly to the center pivot, and tubing of a rectangular cross-sectional shape provides further rigidity.

At least one inward support wheel 76 may be mounted on the housing toward the inboard end 14 of the sweep apparatus to at least partially support the housing 50 as well as other elements above the bin floor. In some embodiments, a pair of the support wheels 76 may be utilized, and the wheels may be located on opposite sides of the housing. In some implementations, additional supports 77 may be used along the length of the housing to provide additional or supplemental support to the housing, such as when the sweep apparatus is buried in grain. The degree to which the supports 77 provide the additional support may be adjustable, and in some embodiments the support 77 comprises a jack of the type often used on trailer tongues, although other structures may also be suitably employed.

The foregoing description of an implementation of elements of the disclosure on a bin sweep utilizing paddles is merely illustrative and aspects of the disclosure may be suitable for use with other bin sweep technologies including, for example, auger-based sweeps.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A sweep system for moving particulate matter in a bin having a bin floor, the sweep system comprising:
    a sweep apparatus having a center pivot and at least two branches connected to the center pivot to rotate about a substantially vertical axis of the central pivot, the branches being pivotally connected to the center pivot in a manner permitting a degree of free pivot movement of a said branch about a substantially horizontal axis independent of movement of other said branches, each of the branches including:
        a sweep assembly having an inboard end for locating toward a central area of the bin and an outboard end for locating toward a peripheral area of the bin, each of the sweep assemblies including a particulate sweep structure configured to move the particulate matter toward the inboard end; and
        a drive assembly mounted on the sweep assembly and having at least one wheel extending down to engage the surface of the bin floor such that rotation of the wheel drives the sweep assembly across the floor.

2. The system of claim 1 wherein each sweep assembly of each of the branches of the sweep apparatus separately powered by a motor.

3. The system of claim 2 wherein the motor of a said branch also powers the drive assembly for the branch.

4. The system of claim 1 wherein the sweep apparatus additionally comprises a connection structure connecting the branches of the sweep apparatus to the center pivot such that the branches rotate about the center pivot.

5. The system of claim 4 wherein the connection structure of the sweep apparatus includes:
an inner connector portion connected to one of the branches of the sweep apparatus; and
an outer connector portion mounted on a respective said branch of the sweep apparatus, the outer connector portion being pivotable with respect to the inner connector portion.

6. The system of claim 5 wherein the inner and outer connector portions each comprise a pair of arms, the arms being pivotally linked together.

7. The system of claim 6 wherein the arms of the inner and outer connector portions are connected together by a pivot pin passing through the arms of the connector portions.

8. The system of claim 7 wherein the arms of one of the connector portions includes multiple holes through which the pivot pin is mountable to permit adjustment of a distance between a said branch and the center pivot.

9. The system of claim 1 wherein the sweep apparatus includes two branches.

10. The system of claim 1 wherein the sweep apparatus includes three branches.

11. The system of claim 1 wherein the sweep assembly of at least one branch includes a plurality of interconnected paddles movable in a succession on a path along at least a portion of the sweep assembly between the inboard and outboard ends.

12. The system of claim 11 wherein the plurality of paddles are mounted on an endless loop member at spaced locations along the endless loop.

13. A sweep system for moving particulate matter in a bin having a bin floor, the sweep system comprising:
a sweep apparatus having a center pivot and at least two branches connected to the center pivot to rotate about a substantially vertical axis of the central pivot, the branches being pivotally connected to the center pivot in a manner permitting a degree of free pivot movement of a said branch about a substantially horizontal axis independent of movement of other said branches, each of the branches including:
a sweep assembly having an inboard end for locating toward a central area of the bin and an outboard end for locating toward a peripheral area of the bin, each of the sweep assemblies including:
a particulate sweep structure configured to move the particulate matter toward the inboard end and including a plurality of interconnected paddles movable in a succession on a path along at least a portion of the sweep assembly between the inboard and outboard ends;
a motor connected to the plurality of interconnected paddles to move the paddles along the path; and
a drive assembly mounted on the sweep assembly and having at least one wheel extending down to engage the surface of the bin floor such that rotation of the wheel drives the sweep assembly across the floor.

14. The system of claim 13 wherein the motor of a said branch also powers the drive assembly for the branch.

15. A system comprising:
a bin having a horizontal bin floor and a center sump extending into the bin floor;
a sweep apparatus resting on the bin floor, the sweep apparatus having a center pivot and at least two branches connected to the center pivot to rotate about a substantially vertical axis of the central pivot, the branches being pivotally connected to the center pivot in a manner permitting a degree of free pivot movement of a said branch about a substantially horizontal axis independent of movement of other said branches, each of the branches including:
a sweep assembly having an inboard end for locating toward a central area of the bin and an outboard end for locating toward a peripheral area of the bin, each of the sweep assemblies including:
a particulate sweep structure configured to move the particulate matter toward the inboard end and including a plurality of interconnected paddles movable in a succession on a path along at least a portion of the sweep assembly between the inboard and outboard ends;
a motor connected to the plurality of interconnected paddles to move the paddles along the path; and
a drive assembly mounted on the sweep assembly and having at least one wheel extending down to engage the surface of the bin floor such that rotation of the wheel drives the sweep assembly across the floor.

16. The system of claim 15 wherein the motor of a said branch also powers the drive assembly for the branch.

* * * * *